United States Patent
Rupp et al.

(10) Patent No.: US 10,834,939 B2
(45) Date of Patent: Nov. 17, 2020

(54) FLAVOR STATION ASSEMBLY

(71) Applicant: Snowie, LLC, Salt Lake City, UT (US)

(72) Inventors: Carl A. Rupp, Salt Lake City, UT (US); David Rupp, Salt Lake City, UT (US)

(73) Assignee: Snowie, LLC, Salt Lake City, UT (US)

( * ) Notice: Subject to any disclaimer, the term of this patent is extended or adjusted under 35 U.S.C. 154(b) by 9 days.

(21) Appl. No.: 16/163,352

(22) Filed: Oct. 17, 2018

(65) Prior Publication Data

US 2019/0045808 A1    Feb. 14, 2019

Related U.S. Application Data

(63) Continuation of application No. 15/375,437, filed on Dec. 12, 2016, now Pat. No. 10,130,111.

(51) Int. Cl.
*B67D 3/00* (2006.01)
*A23G 9/04* (2006.01)
*A23G 9/24* (2006.01)

(52) U.S. Cl.
CPC .............. *A23G 9/245* (2013.01); *A23G 9/045* (2013.01); *B67D 3/00* (2013.01)

(58) Field of Classification Search
CPC . A23G 9/24; A23G 9/245; A23G 9/28; A23G 9/045; B67D 3/0009; B67D 3/0019; B67D 3/008; B67D 3/0083; B67D 3/0087; B67D 3/041; B67D 3/00; B60P 3/0257; B60P 3/00; B60P 3/007; B60P 3/025; B60R 2011/004; B60R 2011/0082
USPC ......................................................... 222/608
See application file for complete search history.

(56) References Cited

U.S. PATENT DOCUMENTS

| | | | | |
|---|---|---|---|---|
| 3,490,654 A | * | 1/1970 | Fischer | B65G 53/66 406/123 |
| 3,544,009 A | * | 12/1970 | Schlueter | A01M 7/0075 239/167 |
| 4,288,034 A | * | 9/1981 | Widmer | A01M 7/0075 239/159 |
| 4,406,384 A | * | 9/1983 | Schantz | B60R 9/06 224/329 |
| 5,518,159 A | * | 5/1996 | DeGuevara | B60R 9/06 224/488 |
| 6,701,913 B1 | * | 3/2004 | LeDuc | B60R 9/06 126/276 |
| 7,413,132 B1 | * | 8/2008 | Bogart | A01M 7/0053 239/163 |
| 9,321,387 B2 | * | 4/2016 | Lamb | B67D 1/0889 |
| 9,352,679 B2 | * | 5/2016 | Tollefson | B60P 3/0257 |
| 9,549,564 B2 | * | 1/2017 | Rupp | A23G 9/00 |

(Continued)

FOREIGN PATENT DOCUMENTS

EP       2942232 A1 * 11/2015       ............ B60P 3/0257

*Primary Examiner* — Frederick C Nicolas
(74) *Attorney, Agent, or Firm* — Kirton McConkie; Brian Tucker

(57) ABSTRACT

A flavor station assembly can be employed to dispense snow cone flavors or other types of flavoring syrups or liquids. The flavor station assembly can include one or more saucer assemblies where each saucer assembly is configured to dispense a number of flavors. Each saucer assembly can be coupled to a support assembly that is configured to pivot thereby enabling the saucer assemblies to be positioned in a desired location relative to the structure to which the support assembly is mounted.

18 Claims, 12 Drawing Sheets

(56) References Cited

U.S. PATENT DOCUMENTS

| | | | |
|---|---|---|---|
| 9,668,498 B2* | 6/2017 | Rupp | A23G 9/245 |
| 9,835,285 B1* | 12/2017 | Hurley | F16M 13/02 |
| 9,862,299 B2* | 1/2018 | Johnson | B60P 3/0257 |
| 10,112,522 B2* | 10/2018 | Tollefson | A23G 9/288 |
| 10,130,111 B2* | 11/2018 | Rupp | A23G 9/045 |
| 10,231,471 B2* | 3/2019 | Tollefson | B60P 3/0257 |
| 10,433,569 B2* | 10/2019 | Rupp | A23G 9/28 |
| 2009/0289017 A1* | 11/2009 | Koeze | B60P 3/0257 |
| | | | 211/1.3 |
| 2013/0053220 A1* | 2/2013 | Monaco | A63B 17/04 |
| | | | 482/39 |
| 2017/0209733 A1* | 7/2017 | Beaver | A63B 23/03558 |

* cited by examiner

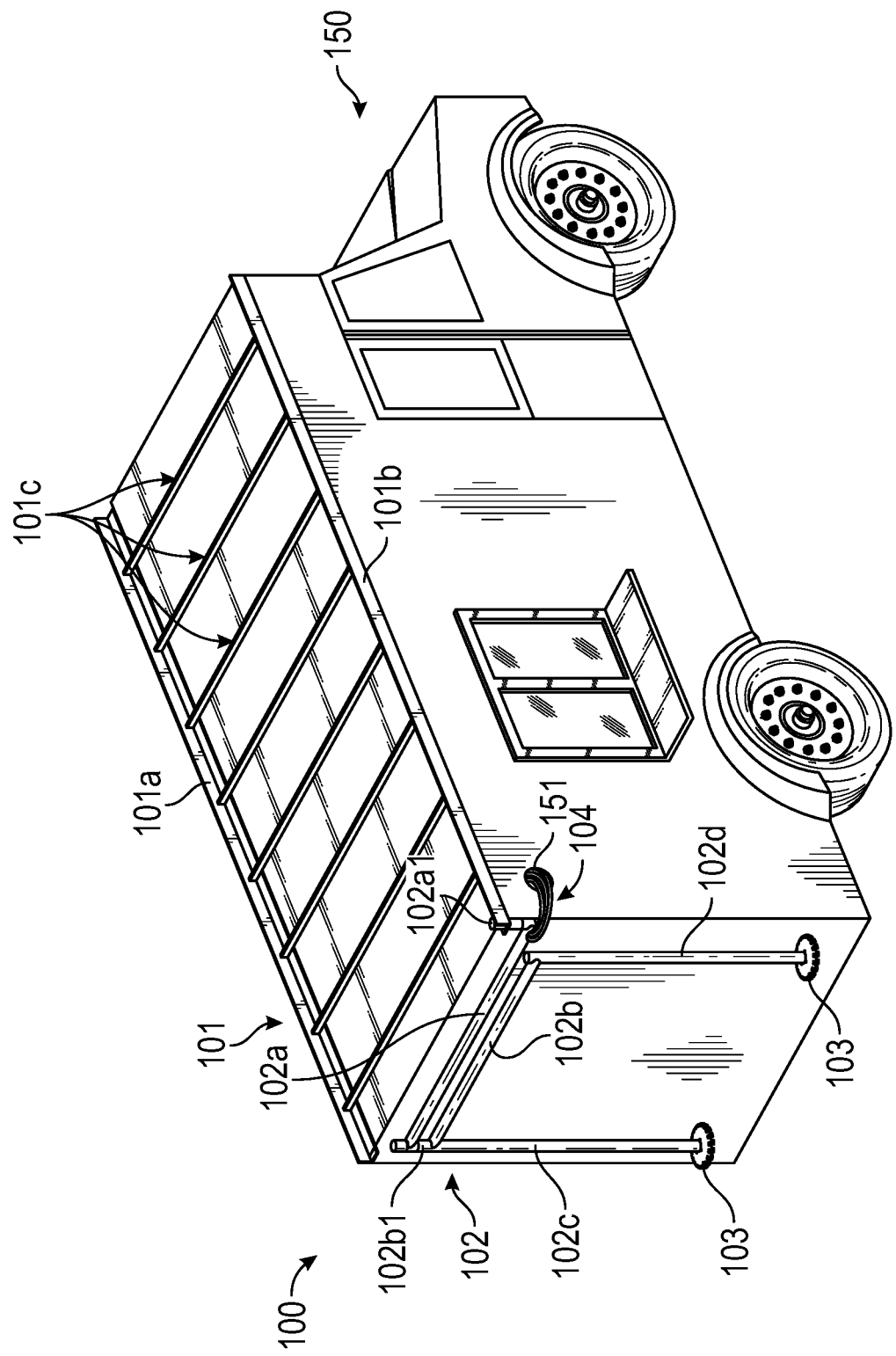

FIG. 5A  FIG. 5B

FLAVOR STATION ASSEMBLY

CROSS-REFERENCE TO RELATED APPLICATIONS

This application is a continuation of U.S. patent application Ser. No. 15/375,437 which was filed on Dec. 12, 2016.

BACKGROUND

Snow cones and other flavored ice novelties (hereinafter simply "snow cones") are oftentimes served from a truck or a non-permanent structure (e.g., a booth). This allows the vendor to easily sell at a variety of locations and/or events. These snow cone vendors may also desire to provide a self-service flavor station where a variety of flavors are available. This allows the consumer to select which flavor he or she wants while also relieving the vendor from dispensing flavors.

Although, in theory, these self-service flavor stations should allow a greater number of consumers to be served, this is not always the case. For example, some consumers, such as children, may be indecisive when faced with a number of flavor choices. In such cases, a line may form around the flavor station as consumers wait to dispense flavoring. Also, in environments where the flavor station may be positioned by or on the truck or other serving structure, the line of consumers waiting to dispense flavors may interfere with the line of consumers waiting to purchase snow cones. This type of congestion can detract from the overall experience and can discourage consumers from purchasing snow cones.

BRIEF SUMMARY

The present invention extends to a flavor station assembly that can be employed to dispense snow cone flavors or other types of flavoring syrups or liquids. The flavor station assembly can include one or more saucer assemblies where each saucer assembly is configured to dispense a number of flavors. Each saucer assembly can be coupled to a support assembly that is configured to pivot thereby enabling the saucer assemblies to be positioned in a desired location relative to the structure to which the support assembly is mounted.

When the flavor station assembly is employed on a truck, the support assembly can be coupled via a pivoting connection to a mounting assembly that is mounted to the truck. In such cases, the flavoring syrup sources can be stored within the truck and tubing for carrying the flavoring syrups can be routed in or along the support assembly to each saucer assembly. Alternatively, when the flavor station assembly is employed on a stationary structure, the support assembly can be coupled via a pivoting connection to the stationary structure.

In one embodiment, the present invention is implemented as a flavor station assembly that comprises a mounting assembly, a support assembly comprising a first horizontal arm that is coupled to the mounting assembly via a pivoting connection and a first vertical arm that is supported by the first horizontal arm, and a first saucer assembly coupled to the first vertical arm.

In another embodiment, the present invention is implemented as a flavor station assembly that includes: a base; a support assembly comprising a vertical post that is secured to the base and that extends upwardly from the base; a saucer assembly coupled to the support assembly; and a container support coupled to the support assembly above the saucer assembly, the container support being configured to support a number of flavoring syrup containers.

In another embodiment, the present invention is implemented as a flavor station assembly comprising: a mounting assembly that is configured to mount to a truck; a support assembly comprising a first horizontal arm that is coupled to the mounting assembly, a second horizontal arm that is coupled to the first horizontal arm, a first vertical arm that extends downwardly from the second horizontal arm, and a second vertical arm that extends downwardly from the second horizontal arm and is spaced from the first vertical arm; a first saucer assembly coupled to the first horizontal arm; and a second saucer assembly coupled to the second horizontal arm. Each of the first and second saucer assemblies is configured to dispense a plurality of flavoring syrups.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIG. 1A illustrates an embodiment of a flavor station assembly that is mounted to a truck when the support assembly is in a closed position;

FIG. 5A illustrates a circular support member that can be employed with the standalone flavor station assembly of FIG. 5;

FIG. 5B illustrates a semicircular support member that can be employed with the standalone flavor station assembly of FIG. 5;

DETAILED DESCRIPTION

In this specification and the claims, the term "flavoring syrup" should be construed as encompassing any liquid that can be dispensed through tubing. Although the specification will describe the invention in the context of snow cones, it is to be understood that the flavor station assembly could be employed to dispense flavoring syrup for other types of food, treats, or beverages. Also, the flavor station assembly will primarily be described as being mounted to a truck. However, the flavor station assembly, and particularly the saucer assembly, could be supported/mounted to other structures and in other manners as will be illustrated below.

Figure 1B:
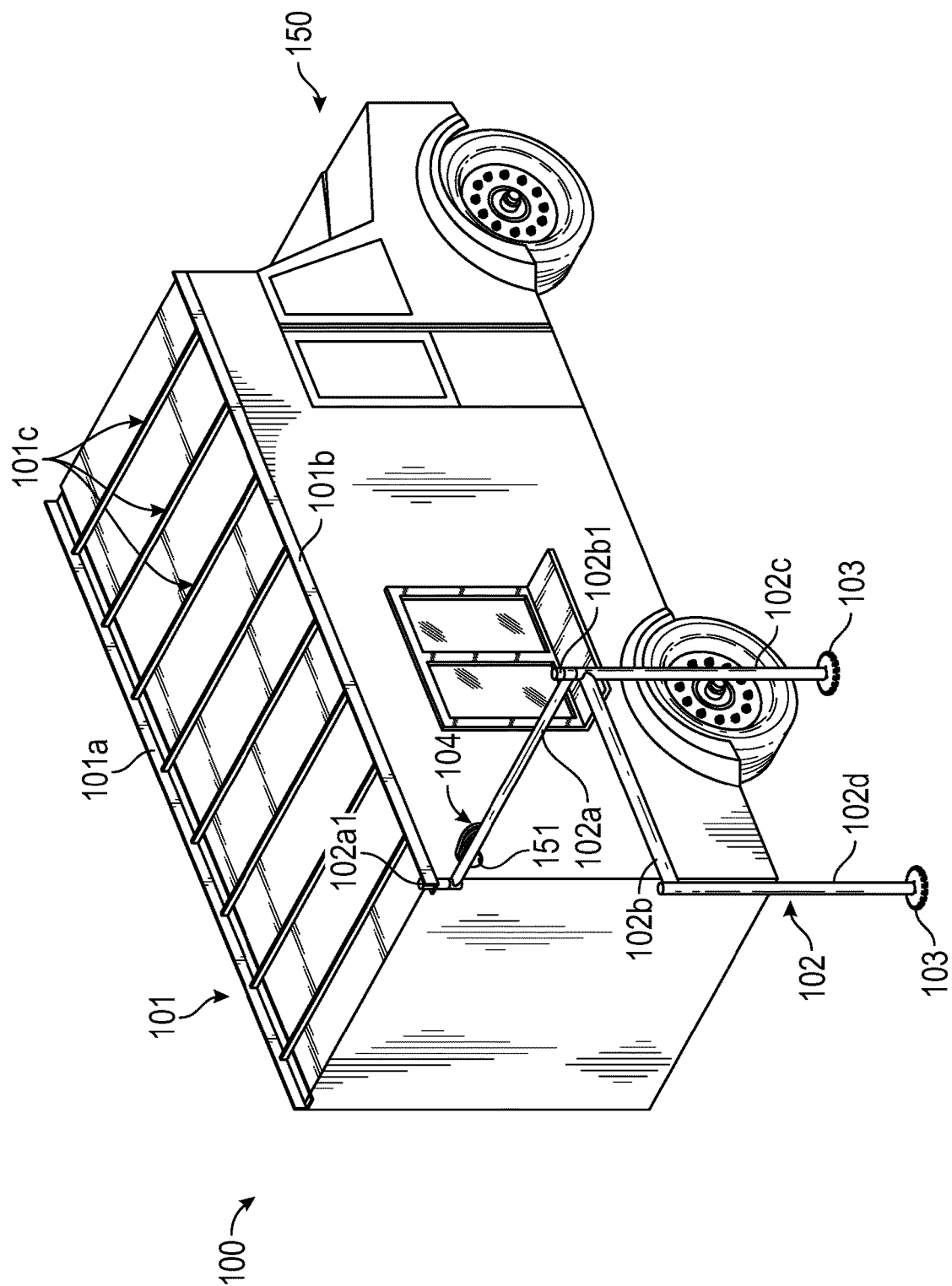
FIG. 1B illustrates the flavor station assembly of FIG. 1A when the support assembly is in an open position.

FIGS. 1A and 1B illustrate an embodiment of a flavor station assembly 100 that is configured to be mounted to a truck. Flavor station assembly 100 includes a mounting assembly 101 for securing flavor station assembly 100 to a truck 150, a support assembly 102 that is coupled to mounting assembly 101 via a pivoting connection, and two saucer assemblies 103 coupled to support assembly 102 in a manner that allows the saucer assemblies to be positioned where consumers may access them. In FIG. 1A, flavor station assembly 100 is in a closed or retracted position, while in FIG. 1B, flavor station assembly 100 is in an open or serving position.

In this embodiment, mounting assembly 101 is configured with two opposing mounting rails 101a, 101b and a number of cross members 101c that interconnect mounting rails 101a, 101b. Mounting rails 101a, 101b and cross members 101c can be configured and oriented to conform to the roof of a truck or other vehicle from which snow cones can be served. For example, mounting rails 101a, 101b can extend along the outer edges of the roof and can be secured to the roof in any suitable manner. Alternatively, in cases where the spacing between mounting rails 101a, 101b may exceed the width of the truck, cross members 101c may be secured to the roof. Although not shown, many other configurations of a mounting assembly could be employed depending on the shape and/or structure of the vehicle or other support structure to which mounting assembly may be coupled. For example, in some embodiments, a vehicle could be manufactured to include an integrated mounting assembly. However, the depicted configuration of mounting assembly 101 may be preferred since it allows a majority of existing trucks to be retrofitted to provide a flavor station assembly. In one specific embodiment, the spacing between mounting rails 101a, 101b may be approximately eight feet.

Support assembly 102 includes a first horizontal arm 102a, a second horizontal arm 102b, a first vertical arm 102c, and a second vertical arm 102d. In this context, the modifiers horizontal and vertical are employed to distinguish between the two orientations of the arms but should not be construed as requiring the arms to be perfectly horizontal or vertical. In some embodiments, each of arms 102a-102d may be a pipe having an outside diameter of 2.5 inches and an inside diameter of 2.25 inches although any reasonable sized pipe or other similar structure could be employed.

First horizontal arm 102a has a first end that is coupled to mounting assembly 101 via a pivoting connection 102a1. In the depicted example, pivoting connection 102a1 is formed on mounting rail 101b but could equally be formed on mounting rail 101a. In some embodiments, such as is shown, pivoting connection 102a1 can be formed on the same side of truck 150 as the serving window and at the rear of the truck. This will allow support assembly 102 to be pivoted into the appropriate positions as will be further described below.

A second end of first horizontal arm 102a is coupled to first vertical arm 102c via a pivoting connection 102b1 such that first vertical arm 102c can rotate relative to first horizontal arm 102a. A first end of second horizontal arm 102b is coupled to first vertical arm 102c while a second end of second horizontal arm 102b is coupled to second vertical arm 102d. In the depicted embodiment, the second end of first horizontal arm 102a forms pivoting connection 102b1. However, in some embodiments, pivoting connection 102b1 can be formed at the first end of second horizontal arm 102b. In other words, pivoting connection 102b1 can be formed in multiple ways as long as it allows second horizontal arm 102b to pivot with respect to first horizontal arm 102a. In contrast to what is depicted in FIGS. 1A and 1B, in some embodiments, first horizontal arm 102a may be configured to couple to second horizontal arm 102b near or at a middle of second horizontal arm 102b.

The length of first and second horizontal arms 102a, 102b can be configured to ensure that, when these arms are in the closed position, they do not extend (or at least do not substantially extend) outwardly beyond the sides of the truck. For example, first horizontal arm 102a could have a length of seven feet, while second horizontal arm 102b could have a length of six feet. Although not shown, pivoting connections 102a1, 102b1 can each include a locking mechanism to retain first and second horizontal arms 102a, 102b in the closed position. In this way, truck 150 can be driven while flavor station assembly 100 is mounted to it. In other embodiments, however, both mounting assembly 101 and support assembly 102 may have a width that exceeds the width of the vehicle to which they are mounted. Accordingly, the relative dimensions of flavor station assembly 100 are not critical to the invention.

Because the length of second horizontal arm 102b defines the spacing between saucer assemblies 103, its length can be maximized relative to the width of truck 150. This can ensure that adequate spacing exists between saucer assemblies 103 to allow multiple consumers to dispense flavoring syrups at the same time. The length of first and second vertical arms 102c, 102d can be configured to cause saucer assemblies 103 to be positioned at the same height or at different heights relative to the ground where they will be easily accessible to consumers. In some embodiments, first and second vertical arms 102c, 102d can be telescoping to allow their heights to be adjusted for a particular situation. For example, it may be desirable to lower the height of saucer assemblies 103 when the consumers are smaller children.

In preferred embodiments, each of arms 102a-102d can be hollow to allow tubing 104 to run through them. However, in other embodiments, tubing 104 may be secured around the exterior of arms 102a-102d. In the depicted embodiment, the sources of the flavoring syrup are stored within vehicle 150. Tubing 104 can be inserted into these sources and then routed through an opening 151 in the body of vehicle 150 and into first horizontal arm 102a (e.g., via an opening positioned near pivoting connection 102a1). In the depicted embodiment, each of saucer assemblies 103 is configured to dispense 20 flavoring syrups. Accordingly, 20 individual tubes can be routed to each saucer assembly 103. In some embodiments, a different set of tubing 104 could be employed for each saucer assembly 103 (i.e., a total of 40 individual tubes could be routed through first horizontal arm 102a). In contrast, in some embodiments, each individual tube may include a splitter (e.g., positioned at or in second pivoting connection 102b1) to direct the particular flavoring syrup to each of the saucer assemblies 103. In such embodiments, there would be a total of 20 individual tubes running through each of arms 102a-102d, and therefore these embodiments may be preferred since they will minimize the required diameter of first horizontal arm 102a.

FIG. 1B illustrates a case where first horizontal arm 102a has been pivoted to extend perpendicularly from mounting rail 101b while second horizontal arm 102b has been pivoted to extend perpendicularly rearward from first horizontal arm 102a. In this orientation, saucer assemblies 103 will be spaced away from the serving window so as to not encumber the line for purchasing snow cones. After receiving a snow cone, a consumer could walk over to either saucer assembly 103 to dispense a desired flavoring syrup. By providing multiple saucer assemblies 103 as well as by spacing these saucer assemblies relative to the truck and one another, the present invention increases the efficiency of dispensing flavoring syrup.

Both pivoting connections 102a1, 102b1 may include a locking mechanism to retain a desired orientation of first and second horizontal arms 102a, 102b. In addition to the orientation shown in FIG. 1B, pivoting connections 102a1, 102b1 may be configured to lock first and second horizontal arms 102a, 102b in a number of other orientations. For example, it may be desired to position saucer assemblies 103 directly behind truck 150 in some environments. This can be accomplished by pivoting first arm 102a to extend directly to the rear.

Although flavor station assembly 100 is shown as including two saucer assemblies, a flavor station assembly in accordance with embodiments of the present invention could equally include a single saucer assembly 103 or more than two saucer assemblies 103. For example, if only a single saucer assembly is desired, support assembly 102 may only consist of first horizontal arm 102a and first vertical arm 102c. In contrast, if three saucer assemblies are desired, a third horizontal arm may be configured to extend from either of first or second vertical arms 102c, 102d and a third vertical arm could extend downwardly from this third horizontal arm. Accordingly, flavor station assembly 100 can include any reasonable number of saucer assemblies.

In some embodiments, one or more of vertical arms 102c, 102d can include or can be configured to support an umbrella or other type of shading canopy (not shown). For example, an umbrella having an adapter configured to sit on top of one of vertical arms 102c, 102d could be stored in truck 150 when not in use and then installed once support assembly 102 has been oriented properly. Alternatively, an umbrella could be configured to mount to one of horizontal arms 102a, 102b.

FIGS. 2A-2E illustrate various views of saucer assembly 103. Saucer assembly 103 includes a disk component 201 and a button component 202 that interlock to form a number of dispensing terminals. In the depicted embodiment, disk component 201 is configured to be positioned on top of button component 202. Disk component 201 and button component 202 each have a generally circular shape and are configured to be coupled to the bottom of one of vertical arms 102c, 102d. Tubing 104, which is preferably routed through vertical arms 102c, 102d can pass through a central opening in each of disk component 201 and button component 202 as will be further described below.

Figure 3A:
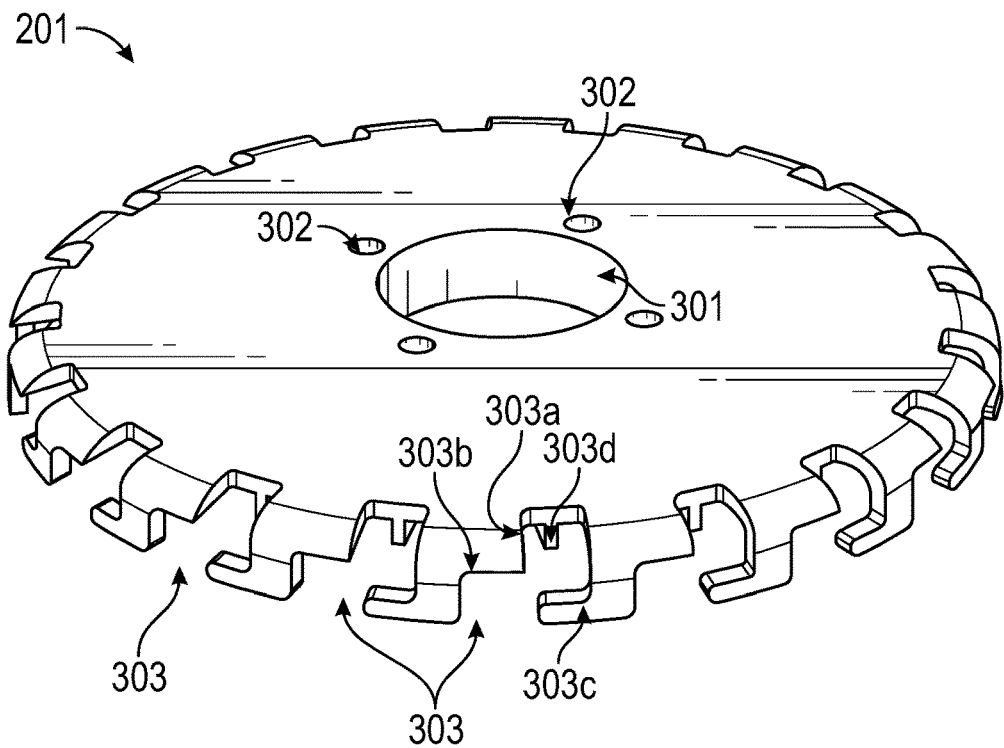
FIGS. 3A and 3B provide top and bottom perspective views of a disk component of the saucer assembly.
Figure 3B:
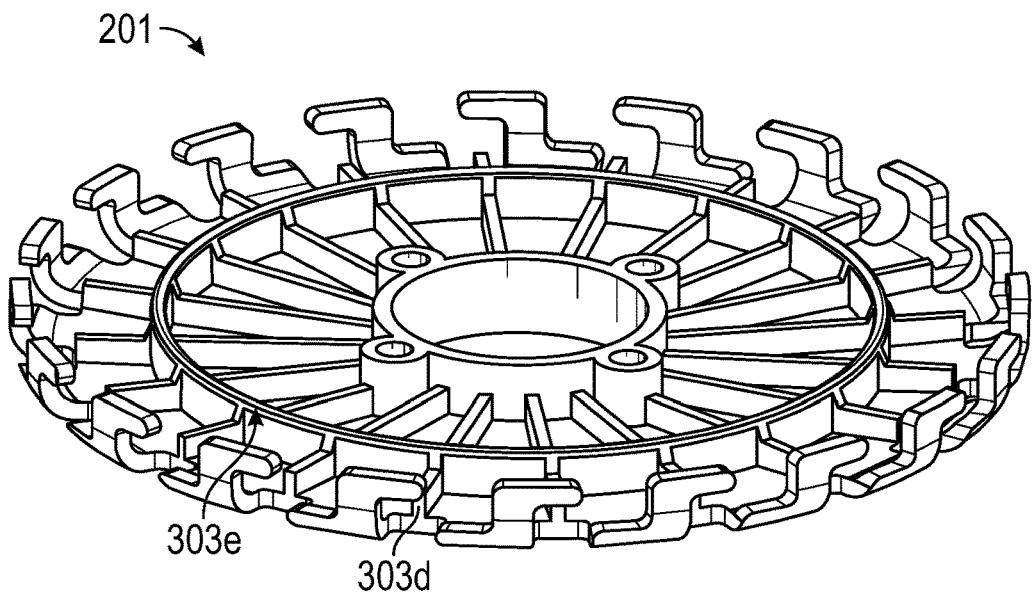

FIGS. 3A and 3B illustrate disk component 201 in isolation. As shown, disk component 201 includes a central opening 301 and a number of mounting holes 302 positioned around central opening 301. Vertical arms 102c, 102d can each include a coupling component (not shown) that includes holes corresponding to mounting holes 302. For example, the coupling component can have an outside diameter that is greater than the outside diameter of the vertical arm 102c, 102d and that includes four threaded holes that align with mounting holes 302 when central opening 301 is aligned with the vertical arm. A bolt can then be used to secure saucer assembly 103 to the coupling component.

Disk component 201 comprises a relatively flat top surface and a sidewall that extends downwardly from the outer edge of this top surface. A number of stepped channels 303 are formed within and spaced around this sidewall. Each channel 303 can include a main channel 303a that overlaps with, but is offset from, an ingress channel 303b. Main channel 303a is deeper (i.e., it extends farther upward) than ingress channel 303b. Due to this difference in depth as well as the offset, a step is formed between main channel 303a and ingress channel 303b. A retaining ledge 303c can extend outwardly into main channel 303a to thereby be positioned below main channel 303a. A top surface of retaining ledge 303c can be offset relative to a top surface of ingress channel 303b to thereby allow passage from ingress channel 303b to main channel 303a.

As is best shown in FIG. 3B, a number of radial ribs 303d may be formed on the underside of the top surface of disk component 201 to thereby reinforce this surface. In some embodiments, radial ribs 303d may align with main channels 303a. A circular ridge 303e may also be formed on the underside of the top surface of disk component 201. As will be further described below, circular ridge 303e forms a clamping surface to occlude tubing 104. Therefore, circular ridge 303e can extend downwardly beyond radial ribs 303d.

Figure 4:
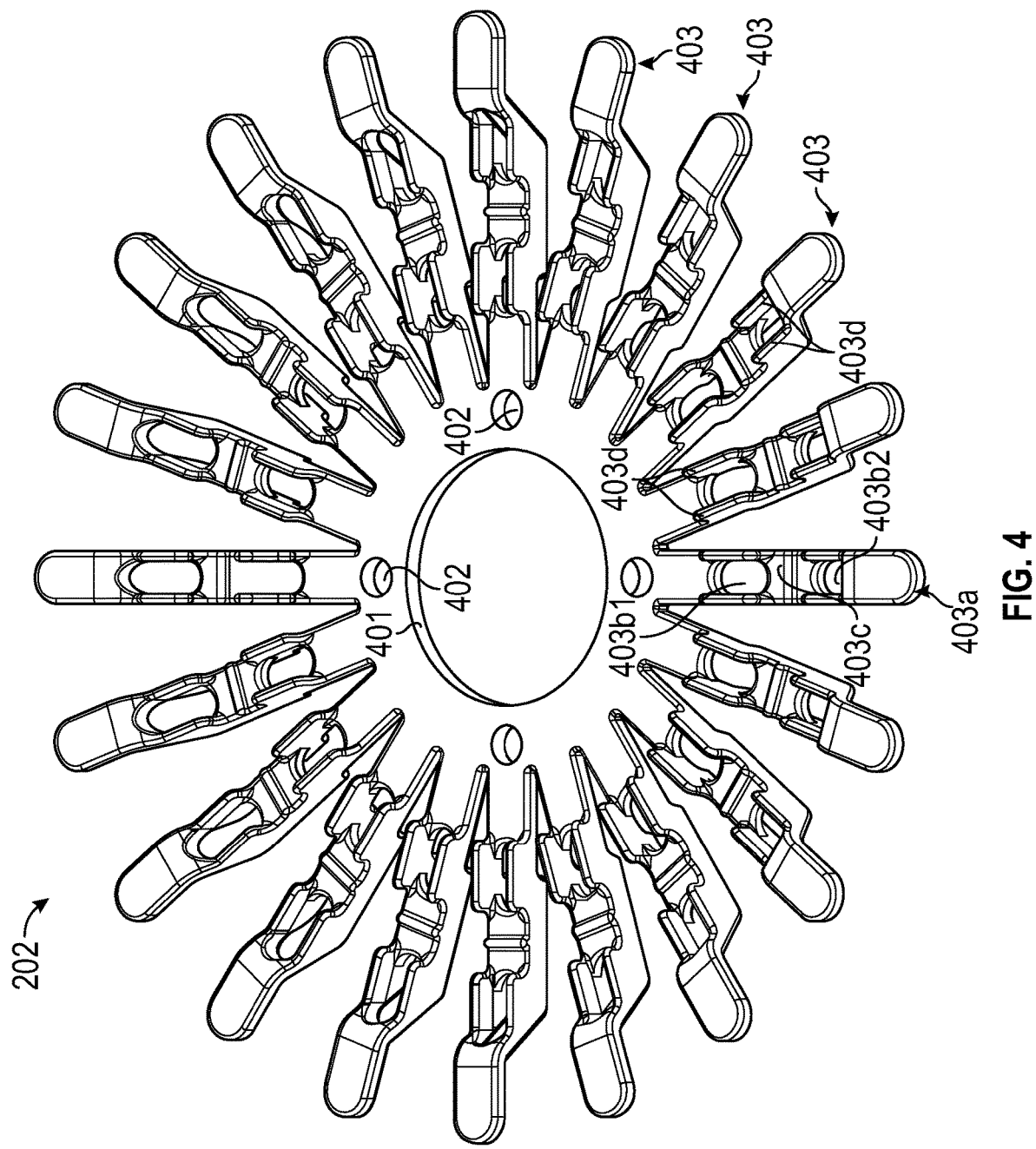
FIG. 4 provides a top perspective view of a button component of the saucer assembly.

Turning now to FIG. 4, an isolated view of button component 202 is provided. Button component 202 can include a central opening 401 corresponding to central opening 301 and a number of mounting openings 402 corresponding to mounting openings 302. Button component 202 includes a number of buttons 403 that extend radially from a central portion of button component 202. The number of buttons 403 can correspond with the number of channels 303. The width of buttons 403 can also correspond with the width of channels 303 thereby allowing buttons 403 to be retained within channels 303.

Each button 403 can include a press tab 403a formed at its end and two openings 403b1, 403b2 spaced along its length. Also, sidewalls 403d can be formed on opposite sides of each button 403 along openings 403b1, 403b2 to provide reinforcement to button 403. The end of button 403 can be angled upwardly so that push tab 403a is positioned above openings 403b1, 403b2. Also, as shown in the depicted embodiment, opening 403b2 can be formed partially within this upwardly angled portion of button 403. Each button 403 may also include a ridge 403c that substantially aligns with circular ridge 303e when saucer assembly 103 is assembled. Ridges 403c and circular ridge 303e can function as clamping surfaces to occlude tubing 401.

Figure 2A:
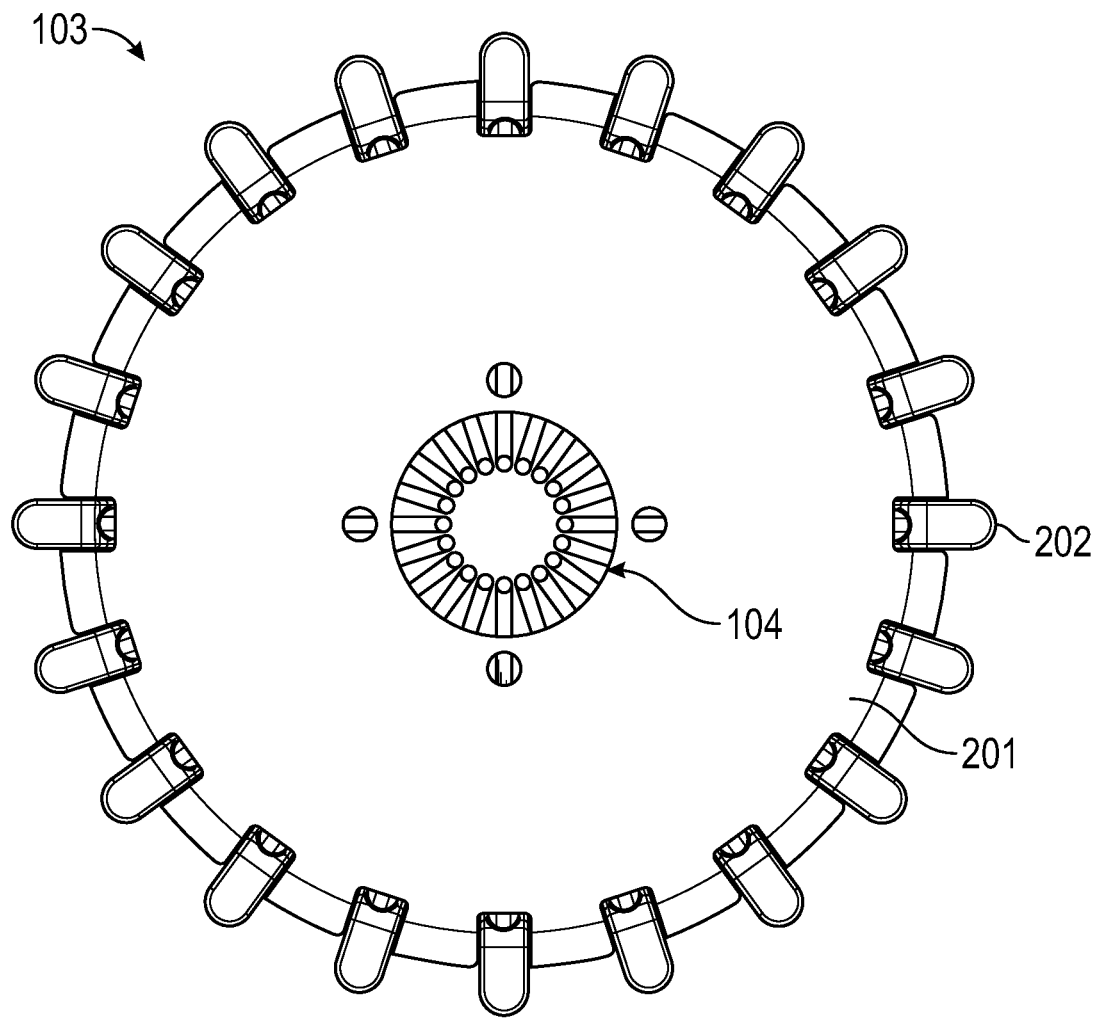
FIG. 2A provides a top view of a saucer assembly that is configured in accordance with one or more embodiments of the present invention.
Figure 2B:
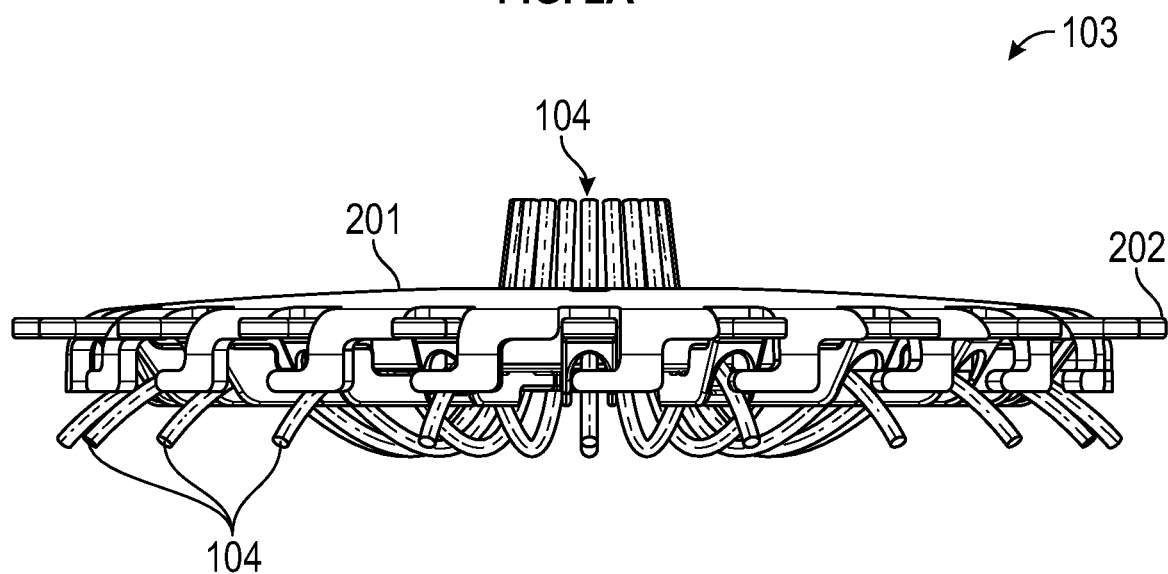
FIG. 2B provides a side view of the saucer assembly.
Figure 2C:
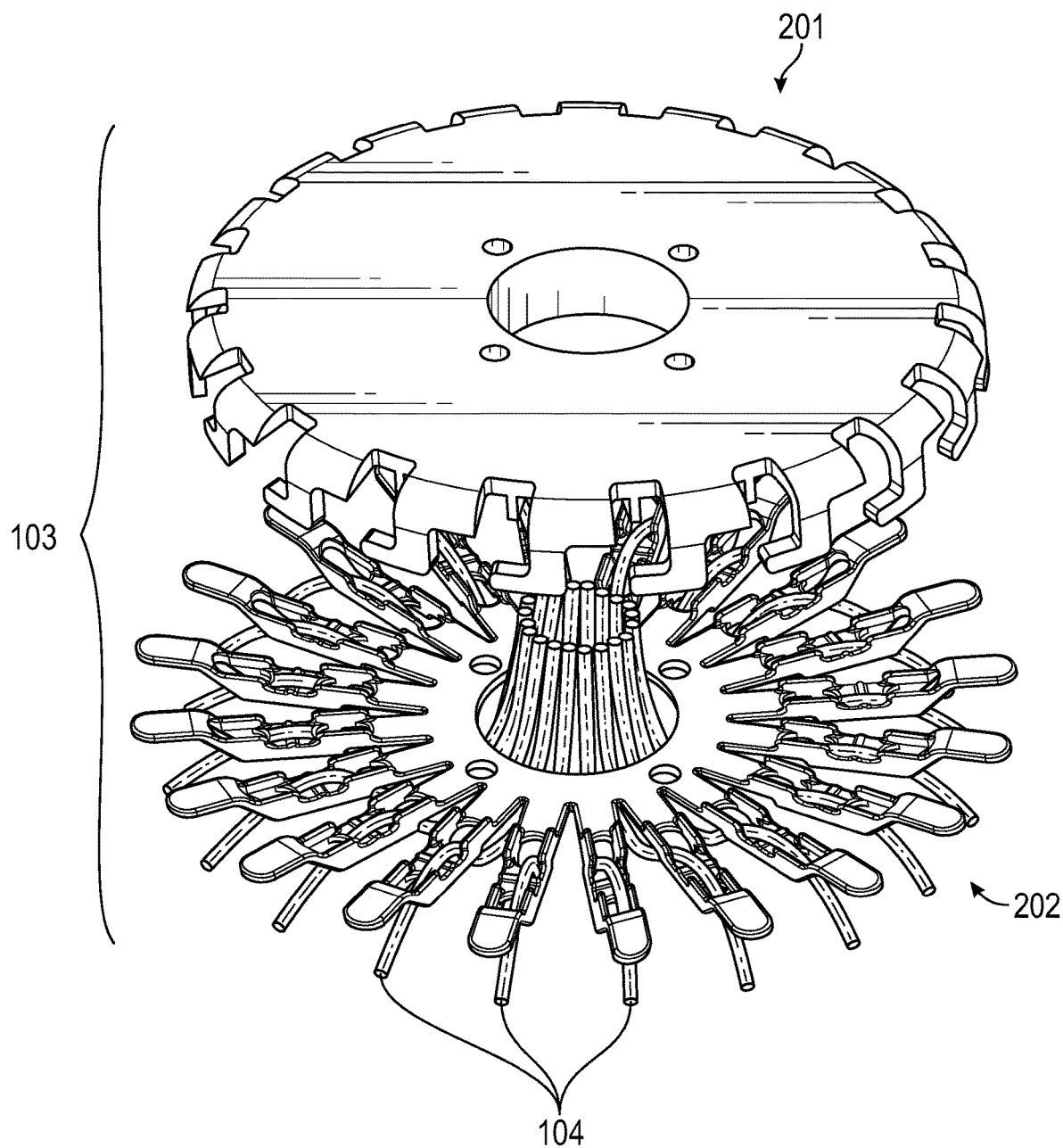
FIG. 2C provides an exploded perspective view of the saucer assembly.
Figure 2D:
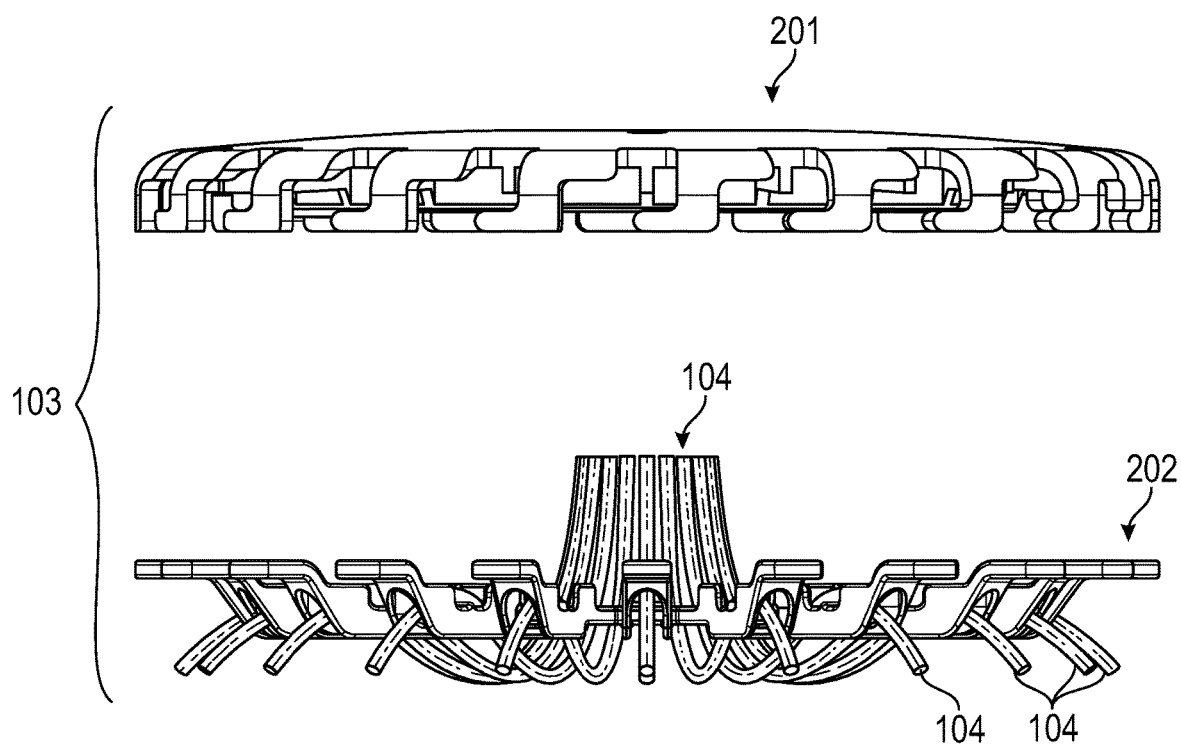
FIG. 2D provides an exploded side view of the saucer assembly.
Figure 2E:
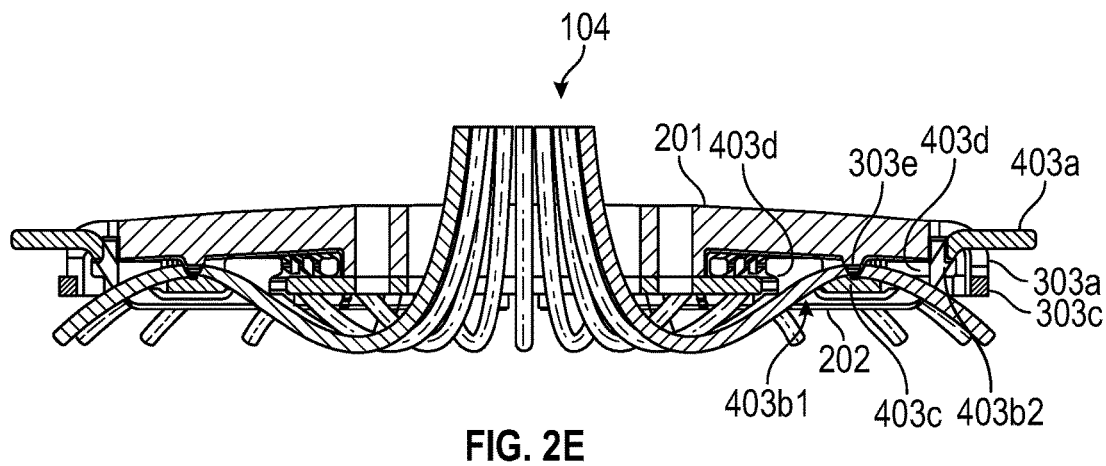
FIG. 2E provides a cross-sectional side view of the saucer assembly.

FIG. 2E illustrates a cross-sectional side view of saucer assembly 103 when assembled. To assemble button component 202 with disk component 201, buttons 403 can be aligned with and then inserted into ingress channels 303b. With buttons 403 inserted into ingress channels 303b, button component 202 can be twisted relative to disk component 201 (e.g., to the right in the depicted embodiment) thereby positioning buttons 403 within main channels 303a. Button component 202 can then be tightened against disk component 201 (e.g., by tightening bolts through mounting holes 302/402). With button component 202 secured to disk component 201, press tabs 403 will be positioned towards the top of main channels 303a and ridges 403c will be forced against circular ridge 303e. Buttons 403 can be formed of a resilient material (e.g., plastic) so that they will be biased into this clamped position.

As shown, tubing 104 can exit vertical arm 102c or 102d and pass through central openings 301, 401. Each individual tube can then be routed upwardly through opening 403b1 and then downwardly through opening 403b2 to position the end of the tube generally below push tab 403a. Due to the biasing of buttons 403, tubing 104 will remain clamped between ridges 403c and circular ridge 303e thereby preventing the flow of flavoring syrup. Then, when it is desired to dispense a particular flavoring syrup, a consumer can press down on the appropriate press tab 403a to thereby unclamp the corresponding tube. As seen best in FIG. 2B, retaining ledge 303c will limit the movement of press tab 403a to thereby prevent button 403 from becoming broken. Tubing 104 can be primed such that the flavoring syrup will flow once the tubing is unclamped. Due to the resiliency of button 403, the tubing will again be clamped once the consumer releases press tab 403a.

Figure 5:
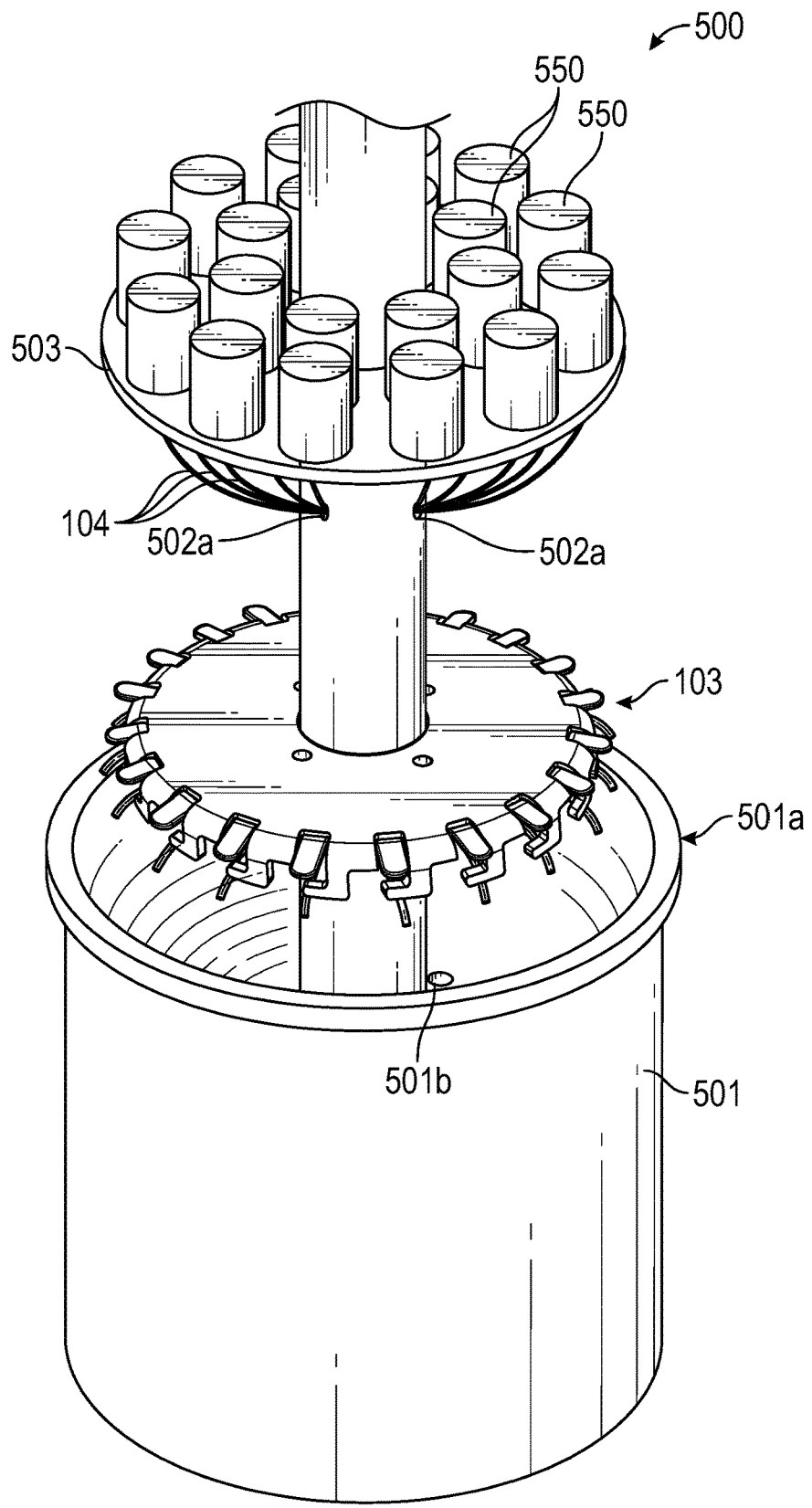
FIG. 5 illustrates an embodiment of a standalone flavor station assembly.
Figure 5C:
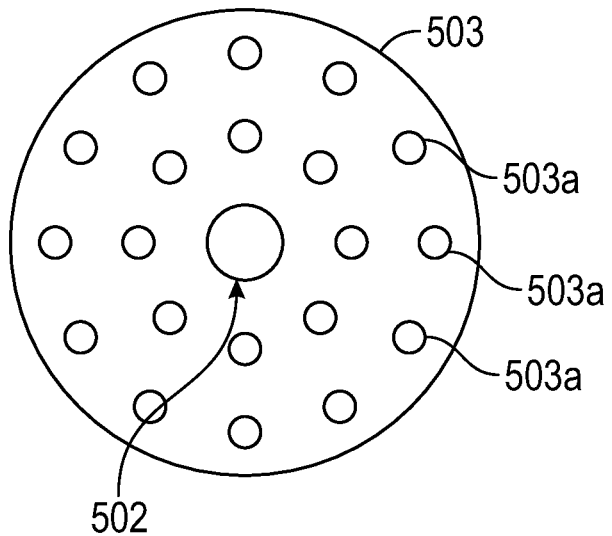
FIG. 5C illustrates a cross-sectional view of the base of the standalone flavor station assembly of FIG. 5.
Figure 5C:
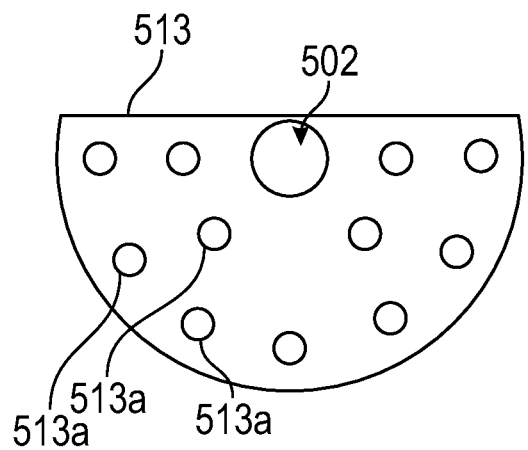
Figure 5C:
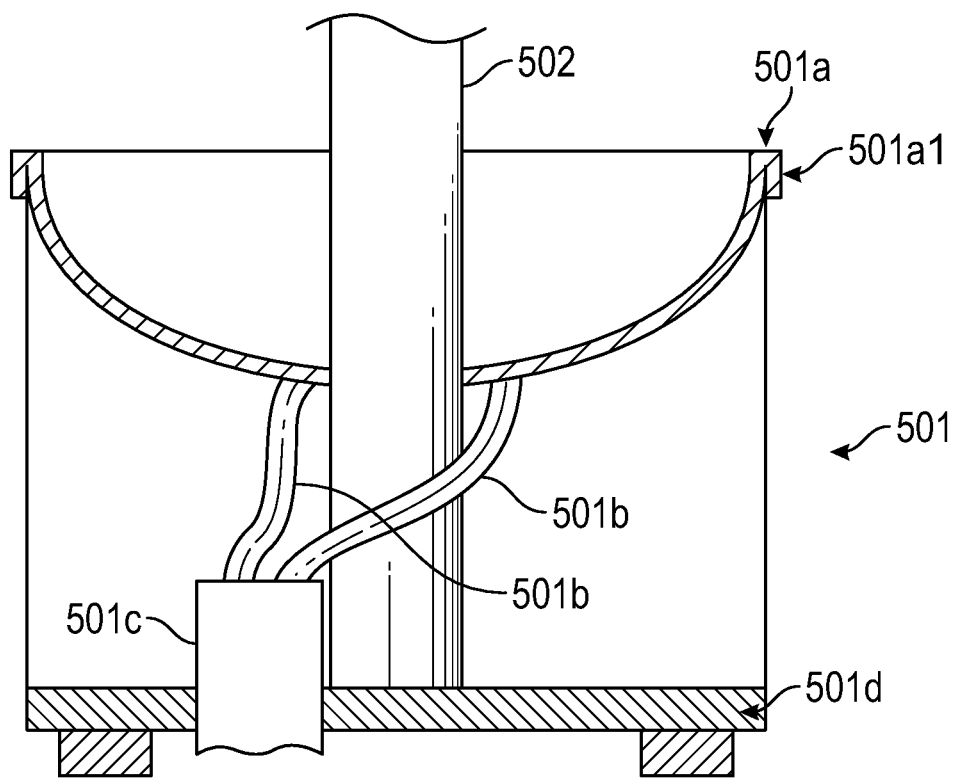

FIG. 5 illustrates a flavor station assembly 500 that is configured as a standalone assembly. As shown, flavor station assembly 500 includes a base 501 that is structured to be placed on the ground or other relatively flat surface near the location where snow cones are served. A support assembly 502 (which may be in the form of a post) may be secured within and extend upwardly from base 501 as is better shown in FIG. 5C. For example, base 501 may include a weighted bottom 501d to which support assembly 502 is secured to minimize the likelihood that flavor station assembly 500 could be tipped over.

Base 501 may also include a drain basin 501a that is positioned near the top of base 501 and functions to collect any flavoring syrup that may drip from saucer assembly 103, or more particularly, from the ends of tubing 104. Drain basin 501a can be substantially bowl-shaped and may include a lip 501a1 for securing it to base 501. Drain basin 501a may also include a central opening through which support assembly 502 extends. One or more drain tubes 501b may extend from openings formed at or near the bottom of drain basin 501a to allow flavoring syrup to flow out of drain basin 501a. Base 501 may incorporate a drain pipe 501c or a collector (not shown). Drain pipe 501c may comprise a pipe that runs from base 501 to a sewage drain or other suitable disposal conduit. In other locations, it may not be possible to dispose of the flavoring syrup, and therefore, base 501 may include a collector into which drain tubes 501b can direct the flavoring syrup for later disposal.

The height of base 501 as well as the relative position where saucer assembly 103 is secured to support assembly 502 can be configured to enable a customer to position a snow cone beneath saucer assembly 103 while dispensing a desired flavoring syrup. Also, the width of base 501 (or at least of drain basin 501a) relative to saucer assembly 103 can be configured to ensure that flavoring syrup will drip into drain basin 501a rather than onto the ground.

Flavor station assembly 500 also includes a container support 503 that is secured to support assembly 502 (e.g., via a central opening in container support 503) and positioned above saucer assembly 103. Container support 503 can comprise a surface that includes a number of openings 503a into which flavoring syrup containers 550 can be inserted. For example, flavoring syrup may typically be packaged in gallon-sized bottles. In such cases, these bottles can be placed upside down through openings 503a. Tubing 104 can be inserted into each of these bottles (e.g., via a cap into which an end of tubing 104 is integrated) such that flavoring syrup will flow through tubing 104 when not clamped by saucer assembly 103. In some embodiments, support assembly 502 can include openings 502a through which tubing 104 can be inserted to allow tubing 104 to be routed to saucer assembly 103 within support assembly 502.

FIGS. 5 and 5A depict an embodiment of flavor station assembly 500 that is not configured to be placed against a wall or other structure. Accordingly, in FIGS. 5 and 5A, base 501, saucer assembly 103, and container support 503 have a generally circular shape to facilitate 360° access. However, in some embodiments, it may be desirable to place flavor station assembly 500 against a wall. In such cases, base 501, saucer assembly 103, and container support 503 may be configured with a flat side. For example, FIG. 5B illustrates how a container support 513 could be configured in a semi-circular shape. Although not shown, both base 501 and saucer assembly 103 could be equally configured with a semi-circular shape. In the embodiment depicted in FIG. 5B, it is assumed that the flavor station assembly would be configured to dispense 11 different flavoring syrups. Accordingly, container syrup 513 is shown as including 11 openings 513a for supporting 11 containers 550.

FIGS. 6 and 6A-6E illustrate another embodiment of a saucer assembly 603 that could be used in place of saucer assembly 103 in any of the above described embodiments. Saucer assembly 603 comprises a top surface 603a from which an inner ring 603b and an outer ring 603c extend downwardly. Each of inner ring 603b and outer ring 603c includes a number of holes 603b1 and 603c1 respectively that are radially aligned to thereby allow a button 604 to be inserted through sets of aligned holes. In these figures, only a single button 604 is shown even though saucer assembly 603 includes 20 sets of aligned holes. It is to be understood, however, that in this embodiment, 20 buttons could be employed to allow 20 different flavoring syrups to be dispensed from saucer assembly 603.

Figure 6:
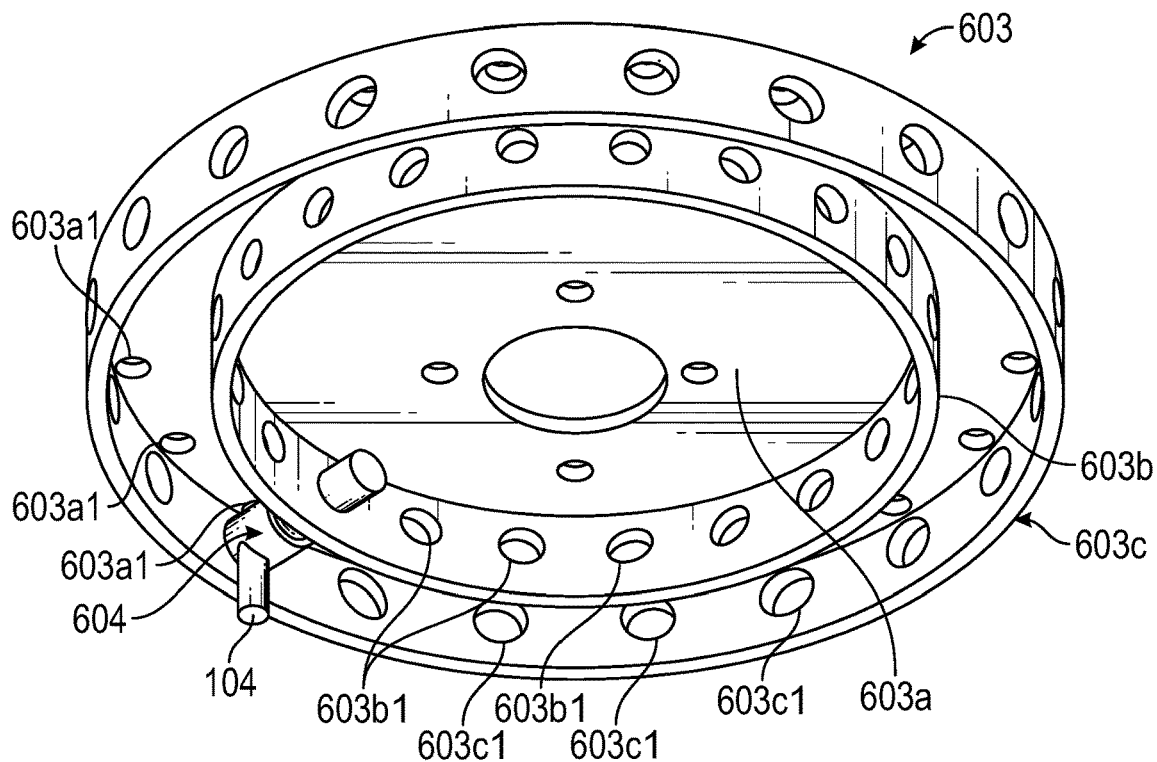
FIG. 6 illustrates another saucer assembly that can be employed in embodiments of the present invention.
Figure 6A:
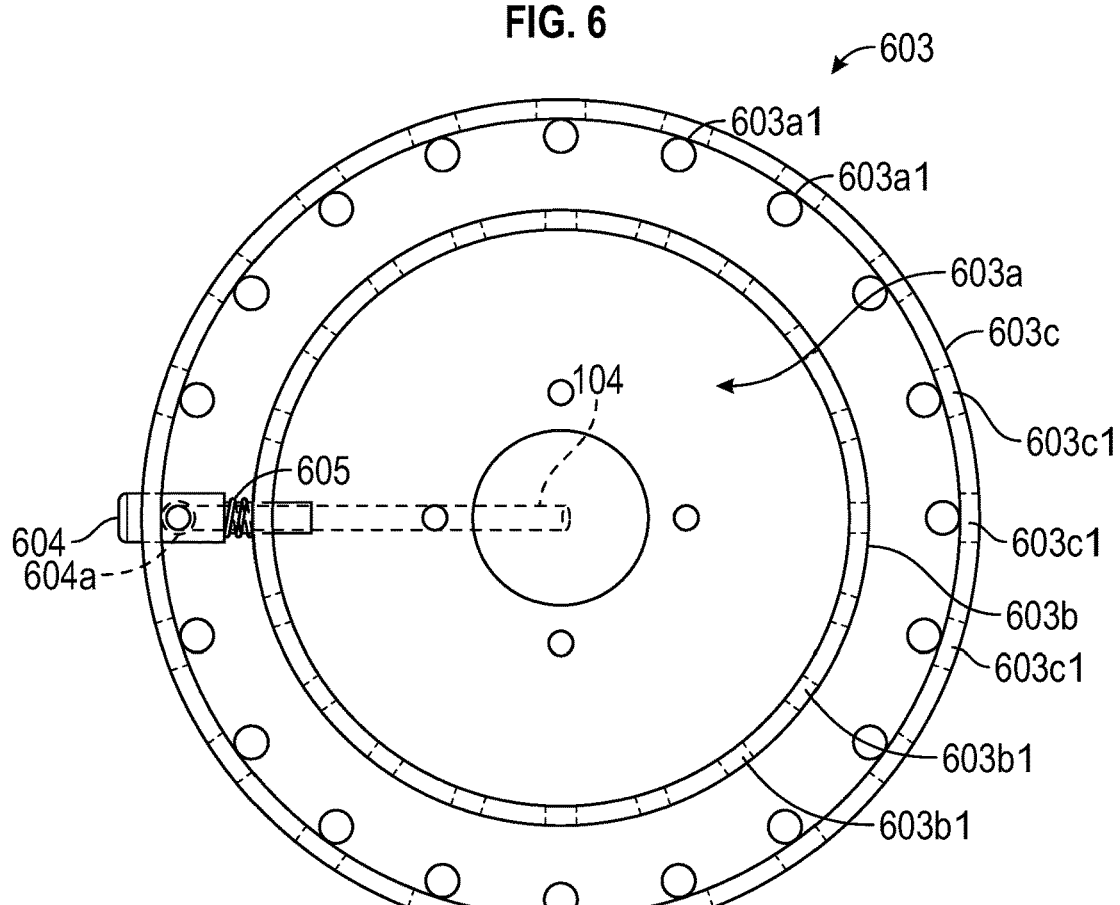
FIG. 6A provides a bottom view of the saucer assembly of FIG. 6.
Figure 6B:
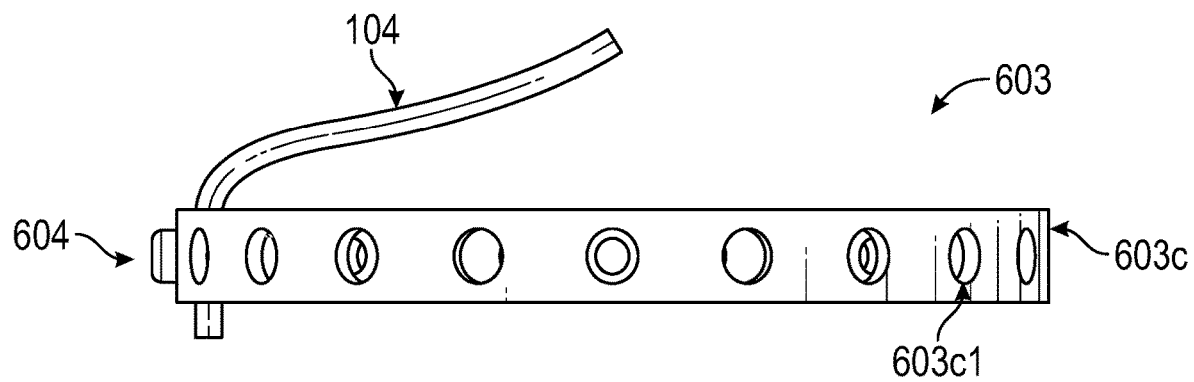
FIG. 6B provides a side view of the saucer assembly of FIG. 6.
Figure 6C:
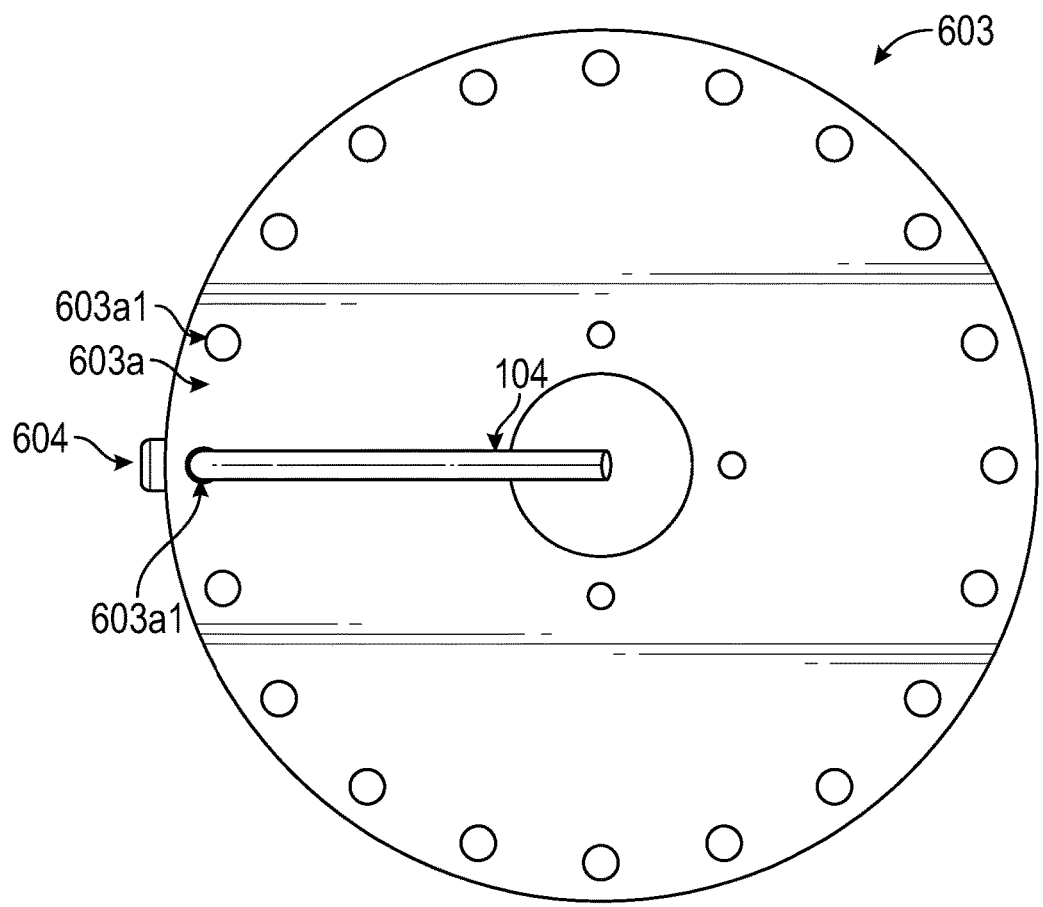
FIG. 6C provides a top view of the saucer assembly of FIG. 6.
Figure 6D:
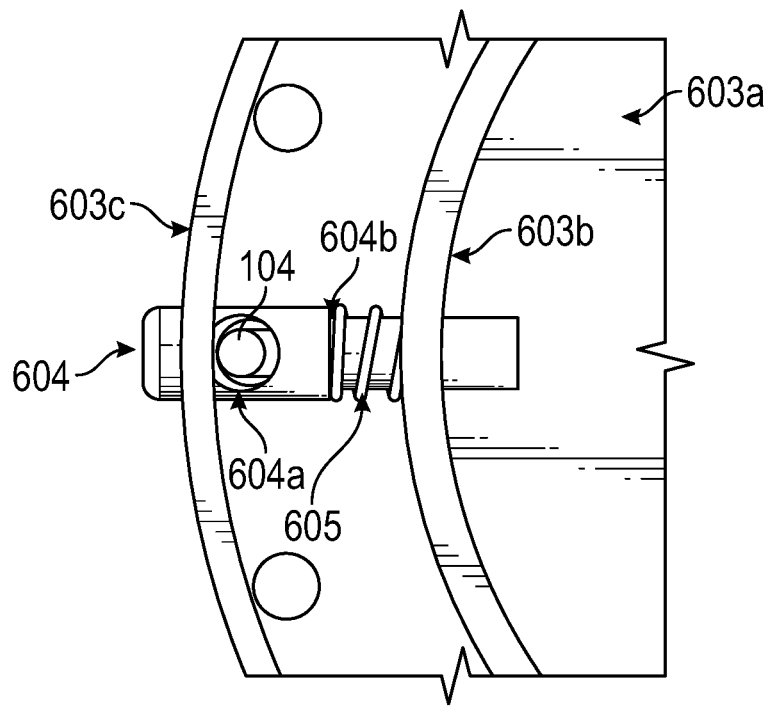
FIG. 6D provides a detailed bottom view of the saucer assembly of FIG. 6.
Figure 6E:
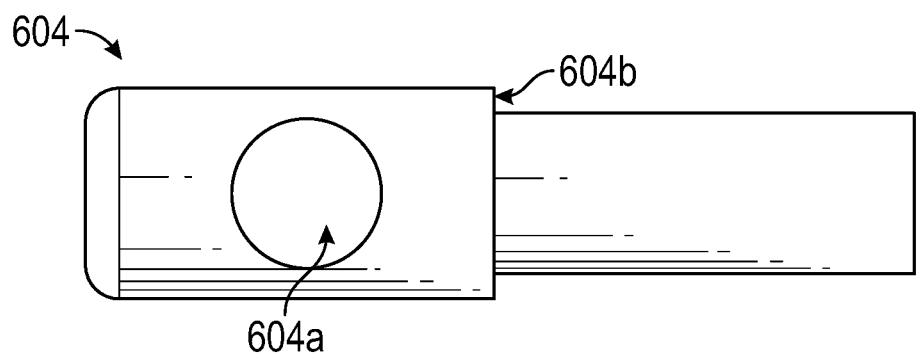
FIG. 6E provides an isolated view of a button that can be employed in the saucer assembly of FIG. 6.

As best shown in FIG. 6E, which depicts button 604 in isolation, the outer end of button 604 is thicker than the inner end such that a ledge 604b is formed. A hole 604a is also formed through button 604 at the outer end. The diameter of each of holes 603b1 can be sufficient to allow the inner end of button 604 to insert through the hole. The diameter of each of holes 603c1 can also be sufficient to allow the outer, thicker end of button 604 to insert through the hole as is best seen in FIG. 6D. A spring 605 can be positioned around the inner end of button 604 so that it is positioned between ledge 604b and ring 603b. Spring 605 will bias button 604 outwardly. Top surface 603a can include holes 603a1 which are positioned to align with holes 604a in buttons 604 when buttons 604 are inserted into holes 603b1/603c1.

As best shown in FIGS. 6B and 6C, tubing 104 (only one of which is shown), can insert downwardly through hole 603a1 and hole 604a so that the end of tubing 104 is positioned below saucer assembly 603. Spring 605 will force button 604 outwardly thereby clamping tubing 104 between ring 603c and the inner wall of hole 604a. Spring 604 can be configured such that this clamping force will be sufficient to occlude tubing 104 to prevent the flow of flavoring syrup. Because tubing 104 extends through hole 604*a*, it will prevent button 604 from dislodging from saucer assembly 603.

Button 604 can have a sufficient length so that its outer end extends beyond ring 603*c*. When it is desired to dispense flavoring syrup, a customer can simply press the outer end of button 604 to force it inwardly and thereby unclamp tubing 104. Then, when the customer ceases pressing button 604, spring 605 will return button 604 to its original, clamping position.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A flavor station assembly for use on a vehicle comprising:
a mounting assembly that is configured to be secured to the vehicle;
a support assembly coupled to the mounting assembly, the support assembly being configured to selectively extend outwardly from the mounting assembly;
one or more saucer assemblies for dispensing flavoring syrup; and
a plurality of tubes, each of which is coupled to one of the one or more saucer assemblies and supported from the support assembly such that when the support assembly is extended outwardly from the mounting assembly, the tubes are positioned away from the vehicle.

2. The flavor station assembly of claim 1, wherein the mounting assembly comprises mounting rails.

3. The flavor station assembly of claim 2, wherein the mounting assembly comprises one or more cross members that extend between the mounting rails.

4. The flavor station assembly of claim 3, wherein the mounting rails are configured to extend along opposing sides of a roof of the vehicle and the one or more cross members are configured to extend across the roof.

5. The flavor station assembly of claim 1, wherein the support assembly is coupled to the mounting assembly via a pivoting connection.

6. The flavor station assembly of claim 5, wherein the support assembly includes a horizontal arm having a first end that is coupled to the mounting assembly via the pivoting connection.

7. The flavor station assembly of claim 6, wherein the support assembly includes at least one vertical arm that is coupled to the horizontal arm.

8. The flavor station assembly of claim 7, wherein the at least one vertical arm extends downwardly from the horizontal arm.

9. The flavor station assembly of claim 6, wherein the plurality of tubes extend at least partially within the horizontal arm.

10. The flavor station assembly of claim 1, wherein the mounting assembly is configured to be secured to one or both of a top or a sidewall of the vehicle.

11. The flavor station assembly of claim 1, wherein the one or more saucer assemblies comprise two saucer assemblies, and wherein the support assembly includes a horizontal arm from which each of the plurality of tubes is supported.

12. The flavor station assembly of claim 1, wherein the tubes extend through a sidewall of the vehicle.

13. A vehicle for dispensing flavoring syrup comprising:
a support assembly that is coupled to the vehicle, the support assembly being configured to be selectively oriented in a closed position in which the support assembly is retracted towards the vehicle and an open position in which the support assembly extends outwardly away from the vehicle;
tubing that extends out from the vehicle and that is supported by the support assembly, wherein the tubing extends through a sidewall of the vehicle; and
one or more flavoring syrup dispensing assemblies that are coupled to the tubing, each flavoring syrup dispensing assembly being configured to dispense flavoring syrup contained within the tubing.

14. The vehicle of claim 13, further comprising:
a mounting assembly that is positioned along a roof of the vehicle, the support assembly being coupled to the vehicle via the mounting assembly.

15. The vehicle of claim 13, wherein the support assembly pivots between the closed position and the open position.

16. The vehicle of claim 13, wherein each of the one or more flavoring syrup dispensing assemblies comprises a saucer assembly.

17. The vehicle of claim 13, wherein the vehicle is one of a truck, a van or a trailer.

18. A flavor station assembly for use on a vehicle comprising:
a mounting assembly that is configured to be secured to the vehicle;
a support assembly coupled to the mounting assembly, the support assembly including a horizontal arm that is configured to be selectively oriented between a closed position in which the horizontal arm is retracted towards the vehicle and an open position in which the support assembly extends outwardly away from the vehicle;
tubing that extends through a sidewall of the vehicle, along the horizontal arm and to one or more flavoring syrup dispensing assemblies such that the horizontal arm positions the tubing and the one or more flavoring syrup dispensing assemblies away from the vehicle when the horizontal arm is in the open position.

* * * * *